(12) United States Patent
Smith

(10) Patent No.: US 8,032,724 B1
(45) Date of Patent: Oct. 4, 2011

(54) DEMAND-DRIVEN OPPORTUNISTIC GARBAGE COLLECTION IN MEMORY COMPONENTS

(75) Inventor: Ronald Smith, Phoenix, AZ (US)

(73) Assignee: Marvell International Ltd. (BM)

( * ) Notice: Subject to any disclaimer, the term of this patent is extended or adjusted under 35 U.S.C. 154(b) by 786 days.

(21) Appl. No.: 12/062,249

(22) Filed: Apr. 3, 2008

Related U.S. Application Data

(60) Provisional application No. 60/910,102, filed on Apr. 4, 2007.

(51) Int. Cl.
*G06F 12/00* (2006.01)
*G06F 13/00* (2006.01)
*G06F 13/28* (2006.01)

(52) U.S. Cl. .................. 711/159; 711/E12.001

(58) Field of Classification Search .......... 711/159, 711/E12.001
See application file for complete search history.

(56) References Cited

U.S. PATENT DOCUMENTS

| | | | | |
|---|---|---|---|---|
| 5,802,344 | A * | 9/1998 | Menon et al. | 711/165 |
| 7,437,557 | B2 * | 10/2008 | Lee et al. | 713/164 |
| 2003/0229766 | A1 * | 12/2003 | Dice et al. | 711/154 |
| 2010/0223423 | A1 * | 9/2010 | Sinclair et al. | 711/103 |

* cited by examiner

Primary Examiner — Sheng-Jen Tsai

(57) ABSTRACT

A method and system for performing garbage collection in a memory is disclosed. Aspects of the exemplary embodiment include dividing garbage collection into atomic operations, including read, write, and block erase; storing read cycle times, write cycle times, and block erase cycle times of the memory; receiving a communication from a processor indicating at least one idle period when an application executing on the processor will not make a request of the memory, wherein the communication indicates a time duration of the at least one idle period; and in response, performing at least one of the garbage collection atomic operations within the time duration, whereby garbage collection can be performed during the at least one idle period, rather than when the memory is substantially full.

28 Claims, 5 Drawing Sheets

DEMAND-DRIVEN OPPORTUNISTIC GARBAGE COLLECTION IN MEMORY COMPONENTS

CROSS-REFERENCE TO RELATED APPLICATIONS

This application claims the benefit of provisional Patent Application Ser. No. 60/910,102, filed Apr. 4, 2007, assigned to the assignee of the present application, and incorporated herein by reference.

BACKGROUND

Flash memory is one type of non-volatile, rewritable memory commonly used in many types of electronic devices, such as USB drives, digital cameras, mobile phones, and memory cards. Flash memory stores information in an array of memory cells made from floating-gate transistors. In traditional single-level cell (SLC) devices, each cell stores only one bit of information. Some newer flash memory, known as multi-level cell (MLC) devices, can store more than one bit per cell by choosing between multiple levels of electrical charge to apply to the floating gates of its cells.

A NAND memory is accessed by a host system much like a block device such as a hard disk or a memory card. Typically, the host system performs reads and writes to logical block addresses. The NAND memory is divided into blocks and each block is organized into pages or sectors of cells. Blocks may be typically 16 KB in size, while pages may be typically 512 or 2,048 or 4,096 bytes in size. Multi-level NAND cells makes management of NAND devices more difficult, particularly in multithreaded real-time run-time environments.

In response, manufacturers have encapsulated NAND flash as memory devices in which a controller is placed in front of a raw NAND memory. The purpose of the controller is to manage the underlying physical characteristics of the NAND memory and to provide a logical to physical mapping between logical block numbers and physical locations in the NAND memory, which are being accessed by a host system.

Reading and writing are asymmetric behaviors in NAND memories. To read a particular physical block, the address is programmed, and the operation started. After an access time, the data is available. This process of reading blocks can be repeated ad infinitum (ignoring certain NAND disturb phenomenon). Writing blocks is an asymmetric operation because a given block can only be written with data essentially only one time and so is not repeatable like a read.

The initial condition of a NAND cell is to store a logical '1'. To write a data value, wherever there is to be a '0', the data is written and the '1' states are left alone. While it may be possible to continue to overwrite '1' states with '0' states, this is not generally useful. To completely enable the overwriting of a block, the initial condition must be again established. This operation is referred to as an erase cycle.

Using currently available NAND devices as an example, typical read access times are in the range of 25-50 microseconds, write cycle times are in the range of 200-700 microseconds, and erase cycle times are in the range of 2,000-3,000 microseconds. Clearly there is a tremendous variance in performance, depending on the exact circumstances.

In order to mitigate the vast difference between erase and read cycle times, write blocks are grouped together into erase blocks so that the time to erase is amortized over many write blocks, effectively reducing the erase time on a per page basis. In addition, generally more read operations can be performed on a block than erase/write cycle pairs. While there are technological subtleties, generally reads are non-destructive. Because of the nature of the charge storage on the floating gates, erase/write cycle pairs tend to damage the storage cells due to trapped charge in the oxide. For this reason, erase/write cycle pairs should be algorithmically avoided, or when inevitable should be balanced across all blocks. This later mechanism is referred to as "wear leveling".

Because of the impracticality of overwriting data (both because of the wear mechanism and erase block grouping), various techniques are used to virtualize the location of any given logical block. Within the current state of the art is what is called a file translation layer (FTL). This is a driver level software layer which maintains temporary and permanent tables of the mapping between a given logical block number and its physical location in the media. By presenting a logical block device to upper layers of software, any number of file systems may be implemented. Alternatively, a journaling file system may be implemented using the linear array of blocks. Here the blocks are allocated in order of need and the device block allocation is managed as (essentially) a large circular buffer.

As alluded to above, data on NAND devices can be written in a unit of one page, but an erase is performed in the unit of one block. A page can be written only if it is erased, and a block erase will clear the data on its pages. Because a NAND device is write-once, pages are allocated in a block until all the pages in the block are used. Regardless of the specific implementation, obsolete or "overwritten" data in the NAND array is not truly overwritten but simply marked by the number of mechanisms as simply being obsolete or stale. Logically, a block that contains live data is called a valid block, and an "obsolete" block is one that contains obsolete or stale data. If a file is written too many times, for example, it may result in many obsolete blocks in the NAND array.

When all (or nearly all) blocks contain data, blocks that have been written earlier may possibly contain stale data and therefore invalid data. When the NAND device is full or almost full, it becomes necessary to remove the stale data and efficiently pack the remaining valid data to make room in the NAND device. This process is referred to as "garbage collection".

FIG. 1 is a block diagram illustrating a conventional garbage collection on a NAND device. The garbage collection process on a NAND device 10 includes a pre-collection phase 12 and post collection phase 14. During the pre-collection phase 12, all the blocks to be erased, called erase blocks, are examined. Blocks that are stale are available. Blocks that are not stale must be made stale by moving their data, i.e., rewriting the data into a new area. Erase blocks to be erased in a group comprise an erase cluster 16. In this example, the erase cluster 16 includes three valid blocks and one obsolete block 18. The valid blocks are being moved to respective blocks in free cluster 20. For this reason, garbage collection is not done when the NAND device 10 is truly full, but is instead done when the block allocation crosses some threshold determined by file translation management requirements. After all blocks are made stale in the erase cluster 16, the blocks are erased and made available during post collection 14, resulting in free cluster 22. The new beginning of the log 24 is the end of the free cluster 22, and the new end of the log 26 is that last block that was moved.

Because garbage collecting an erase block involves read-then-write operations—first the block must be read to determine its current state and may involve data movement (i.e., writing good data elsewhere to make the current block stale) it can be quite time consuming to perform. The garbage collection time is the sum of the erase time, the summation of the rewritten block and the summation of the other reads necessary to determine the block state. If erase blocks are garbage collected in groups/clusters as shown in FIG. 1, this erase time is yet again increased proportional to the number of blocks being garbage collected.

Because it is not necessarily predictable to an application, operating system (OS) or a file system when a block driver needs to perform garbage collection, any throughput analysis must be able to tolerate a reasonably large asynchronous interruption in performance for the above described garbage collection. This is particularly true because in conventional systems, garbage collection is likely to be delayed until it becomes necessary.

For a single threaded application, such as in a digital still camera, NAND performance can be optimized according to the usage model, and with currently available products in the memory category (e.g. Compact Flash and SD Card) often are. The camera usage model is to: 1) format a flash card; 2) take a picture, writing the data to the card as fast as possible (to minimize click-to-click time); 3) view random pictures to perform edits (e.g. deletion of unwanted pictures); and 4) mass transfer of picture files to another host (such as a desktop or laptop computer). Only steps 2) and 4) have real time performance requirements, and the usage of the storage is highly focused. When writing a new picture to the NAND device, all the NAND device has to do is be able to sustain sufficiently high write bandwidths. Conversely, when the NAND device has to read picture files to transfer to a host, all the NAND device is required to do is sustain sufficiently high read bandwidths.

However, on more complex platforms where there may be multiple streams being read and written to the NAND device, and each stream may have its own characteristics including real-time requirements. Therefore, optimization is not nearly so simple because there are conflicting requirements.

Consider as an example, a multithreaded environment in which two software applications are processing three file streams. One application is recording a real-time media stream (either video or audio) onto the NAND device, while the same application is also playing back either the same or a different media stream. (If it is playing back the same media stream, it is playing back at an earlier time point in the stream.) Assume that the second application is an e-mail client that is receiving e-mail updates over an internet connection and synchronizing the in-box.

In this example, these two applications have different real-time requirements. The media streaming performed by the first application cannot be halted, whereas the e-mail synchronization performed by the second application has no a priori timing requirement. If the media stream write overflows, data will be lost. If the media stream read underflows, there will be annoying gaps in the video or audio playback. If there are delays in the e-mail synchronization, however, the performance will be affected, but since this is demand driven, there is no loss of data.

Typically, media streams are taken from some kind of media source (e.g., over-the-air modem or stored media) at a constant packet rate. These packets may be stored into a ping-pong buffer to make the system resilient to variable latencies in some operations. Media stream data is written into the ping buffer until it is full, then it is written into the pong buffer. When the ping buffer is full, it is read out and passed along to the next stage in the processing pipeline (e.g., the buffer is emptied by software which stores the data onto the NAND device). If the pong buffer is not empty by a consumer by the time the producer is finished loading the ping buffer, there is an overflow situation. If the consumer needs the ping buffer before the ping buffer has been filled, there is an underflow situation.

Large asynchronous garbage collection operations of memory devices may complicate the real-time needs real-time applications, such as in the media stream example. Garbage collection represents a worst case deviation in the typical write access times to memory devices, and this deviation can be extreme when compared to the typical result. The above scheme of using ping/pong buffers can accommodate large and variable latencies only if these latencies are bounded, and these buffers can do so at the expense of becoming very large. This places an additional burden on the platform in that it now requires very large media buffers in order to accommodate an operating condition that is rare.

Memory devices lack an overall context to globally optimize the garbage collection process because memory devices do not have knowledge of the semantics of a given block operation. Accordingly, what would be desirable is a solution which balances the need for NAND management of garbage collection with the needs of applications having different real-time media requirements.

BRIEF SUMMARY

The present invention provides a method and system for performing garbage collection in a memory. Aspects of the exemplary embodiment include dividing garbage collection into atomic operations, including read, write, and block erase; storing read cycle times, write cycle times, and block erase cycle times of the memory; receiving a communication from a processor indicating at least one idle period when an application executing on the processor will not make a request of the memory, wherein the communication indicates a time duration of the at least one idle period; and in response, performing at least one of the garbage collection atomic operations within the time duration, whereby garbage collection can be performed during the at least one idle period, rather than when the memory is substantially full.

According to the method and system disclosed herein, by transmitting memory idle periods from the processor to the memory, such as a memory, and allowing the memory to perform opportunistic garbage collection based on this information, the exemplary embodiments make it no longer necessary for the memory to insert a large asynchronous garbage collection event into the real-time media stream, which may result in a significant reduction in required latency buffers.

DETAILED DESCRIPTION

The present invention relates to demand-driven opportunistic garbage collection in memory components. The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

The preferred embodiment provides demand-driven opportunistic garbage collection in memory components, such as for managed NAND. The exemplary embodiments will be described in terms of managed NAND components. However, one with ordinary skill in the art will readily recognize that the exemplary embodiments may be used with any type of non-volatile memory management system or device in which garbage collection is necessary, such as any other type of FLASH memory or other types of memories, including phase change memory, for instance. The exemplary embodiments will also be described in the context of particular methods having certain steps. However, the method and system operate effectively for other methods having different and/or additional steps not inconsistent with the exemplary embodiments.

Figure 1:
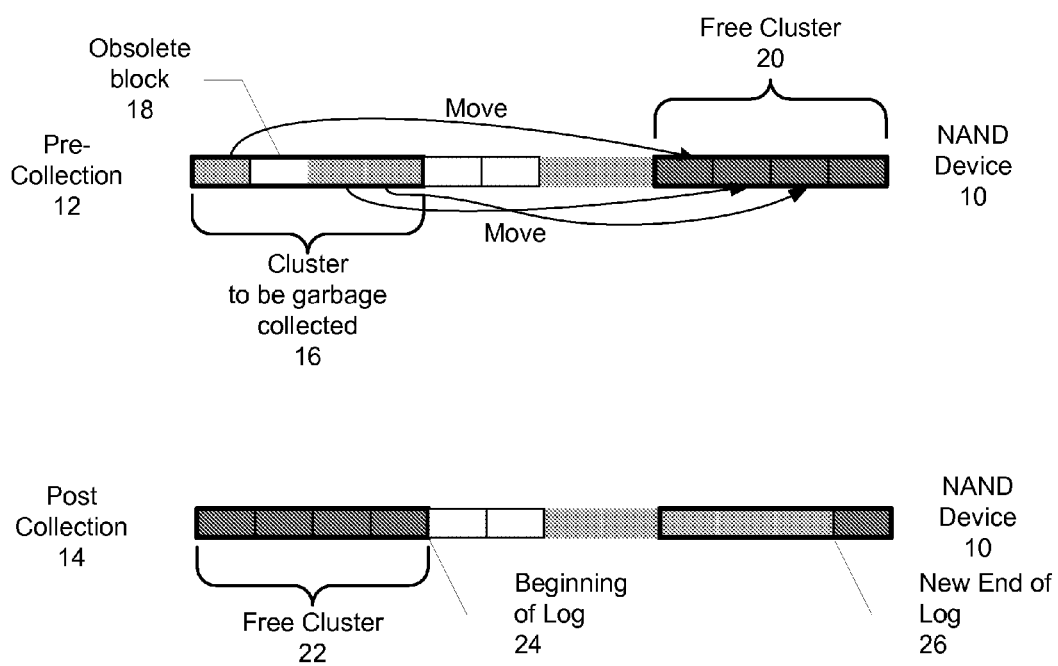
FIG. 1 is a block diagram illustrating a conventional garbage collection on a NAND device.
Figure 2:
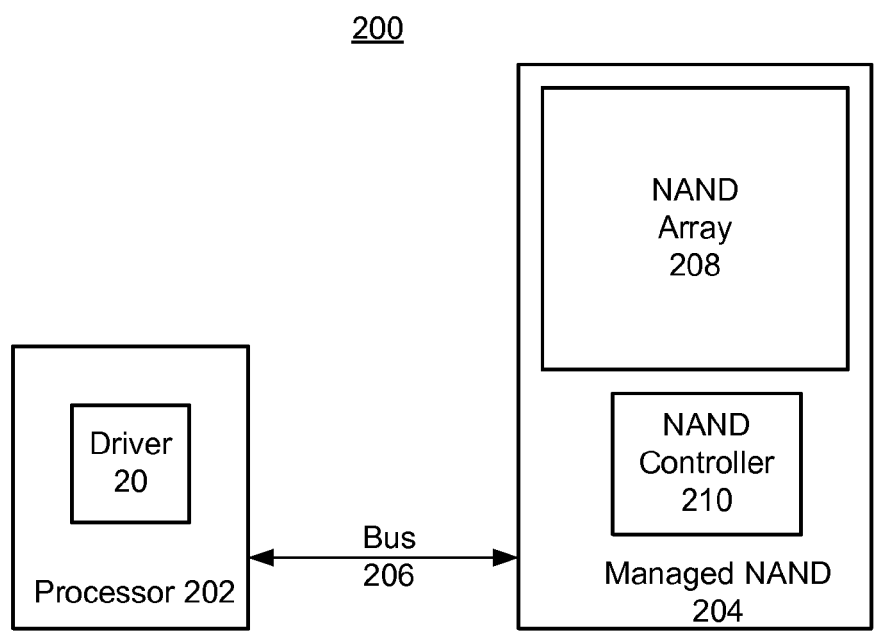
FIG. 2 is a block diagram illustrating an exemplary memory system.

FIG. 2 is a block diagram illustrating an exemplary memory system. The system 200 includes a processor 202 coupled to a managed NAND 204 via a bus interface 206. The processor 202 may be part of a host system that may be any type of electronic device that uses non-volatile memory, such as flash memory, including but not limited to a computer, an embedded device, or a handheld device, such as a cell phone, camera, a media/game player/recorder, a monitor, or a personal digital assistant (PDA), for instance.

The managed NAND 204 includes a NAND array 208 and NAND controller 210 that performs memory management functions for the NAND array 208 as well as having the capability of executing algorithms. The NAND controller 210 can be any type of memory controller that manages memory access, including but not limited to flash disk controllers or central processing units (CPUs). Through the NAND controller 210, the managed NAND 204 may offer configurable interfaces that make the managed NAND 204 adaptable to different processor and memory types. Example standard interfaces for memory devices include CompactFlash® MultiMediaCard (MMC), Sony Memory Stick®, Secure Digital (SD) card, and the like. The processor interface to the managed NAND 204 may be in the form of a software driver 20 executed by the processor 202 that implements the features required by the NAND interface. The managed NAND 204 can be separate from, or part of, the host system. The processor 202 and the managed NAND 204 may be implemented as individual chips, a chipset, or as a system-on-a-chip (SoC).

The NAND controller 210 performs translation management that maps logical blocks accessed by high-level software from the host system into physical blocks in the NAND array 208. To do so, the NAND controller 210 maintains a logical-to-physical translation map between logical addresses supplied by the processor 202 and a physical list of pages in the NAND array 208. Typically, the NAND controller 210 stores the translation maps as tables in a relatively small amount of volatile storage. When the NAND controller 210 receives a request to read a logical block from the processor 202, the NAND controller 210 looks-up the physical address in the translations maps, retrieves, and returns the requested data. A similar process occurs for a write request, except that the NAND controller 210 allocates new physical blocks to be mapped to the written blocks.

The requests to read/write are sent as commands over bus 206 from the processor 202 to the NAND controller 210. The format typically includes a command, an address, and an optional data packet, where the command indicates whether to read or write; the address is the address of the logical block on which the command is being performed; and in the case of a write command, the data packet is the data to be written. Once the NAND controller 210 receives the commands, the NAND controller 210 translates the commands into memory access requests for the NAND array 208.

In response to write requests, the managed NAND 204 is managed by adding new allocation blocks instead of overwriting old allocation blocks, which eventually consumes all available blocks in the NAND array. Thus, at some point, garbage collection will need to be performed to reclaim storage allocated to stale or obsolete data, which can be time consuming. Garbage collection is time-consuming because garbage collection requires a reanalysis of the logical-to-physical translations, and the erase cycle time is the longest cycle time of any of the operations of the NAND.

In some memories, garbage collection can be as long as hundreds of milliseconds. Such a latent seat window may not be objectionable for an application, such as an e-mail client checking e-mail, but for a real-time application such as video, such latency would create an unacceptable application environment. One way to solve this problem would be to incorporate very large offers to compensate for this large latency. The problem here is that the NAND controller in a conventional memory still would have no context into which to make its decisions. The algorithms in the NAND controller are based just on what it sees, which are requests for logical blocks from the host system. Thus, conventional memories lack an overall context to globally optimize behavior because they lacked knowledge of the semantics of a given block operation.

Accordingly, the exemplary embodiment provides a method and system for performing demand-driven opportunistic garbage collection in memory components, such as the memory system 200. The exemplary embodiment provides a globally optimized solution that allows the NAND controller 210 to manage garbage collection (which can be moved in time) around one or more real-time media streams (which cannot be moved in time), thereby balancing the need for management of garbage collection with the needs of applications having different real-time media requirements.

The exemplary embodiment takes advantage of the fact that the managed NAND 204 is attached directly to the processor 202, and the processor 202 through a file system (not shown) and the driver 20 have knowledge of the current application environment of the host system. For example, the processor 202 may know that an e-mail client is running while a media recorder is concurrently recording a data stream and playing back the data stream, for instance. This knowledge is then transmitted from the processor 202 to the NAND controller 210 to provide the NAND controller 210 with a necessary context so that the NAND controller 210 can predict when to take advantage of idle times to globally optimize behavior, such as updating translations and performing garbage collection cycles, for example.

According to the exemplary embodiment, storage performance is globally optimized creating a periodic time structure or real-time schedule showing when executing applications will have managed NAND 204 idle times. In the exemplary embodiment, the real-time schedule is created by the processor 202. In addition, a new command is created for the managed NAND 204 that allows the processor 202 to define a length of time for the managed NAND 204 to perform garbage collection operations based on the idle times in the real-time schedule. The managed NAND 204 divides garbage collection into atomic operations (read/write/erase) and performs those garbage collection atomic operations that can be done in the periods of time indicated in the new command so that garbage collection does not need to wait until the NAND array 208 is full.

Figure 3:
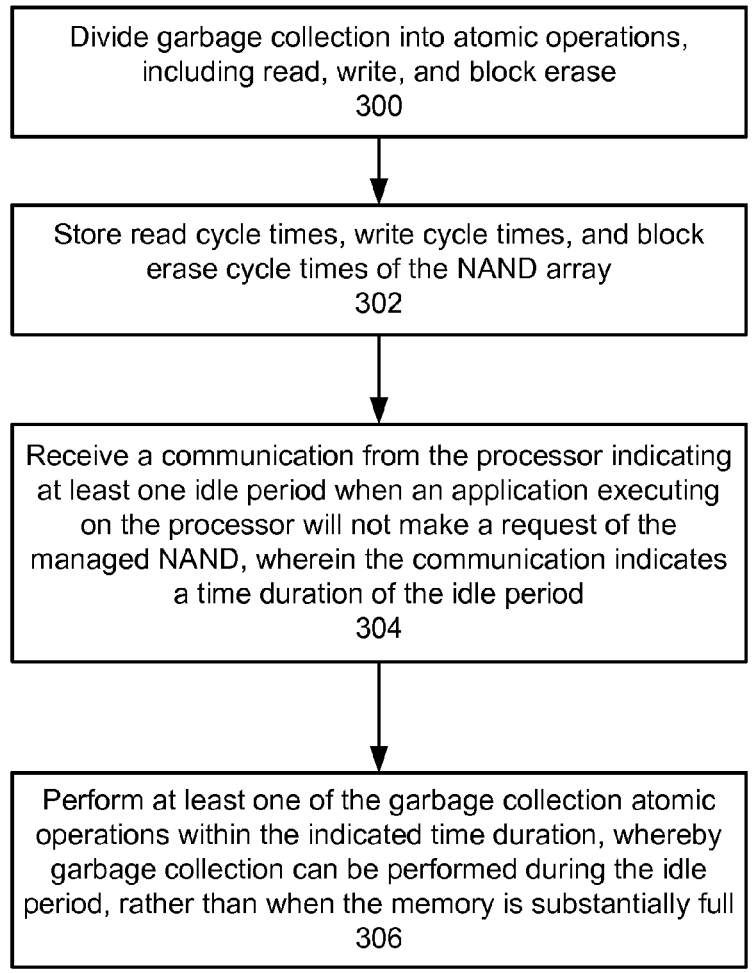
FIG. 3 is a flow diagram illustrating a process for performing demand-driven opportunistic garbage collection in memory components, such as the memory, in accordance with an exemplary embodiment.

FIG. 3 is a flow diagram illustrating a process for performing demand-driven opportunistic garbage collection in memory components, such as the managed NAND 204, in accordance with an exemplary embodiment. The process begins by dividing garbage collection into atomic operations, including read, write, and block erase (block 300). In one embodiment, the garbage collection in the managed NAND 204 is divided into two primary phases: move and erase, where the move phase is the movement of current data to make an erase block completely stale; and the erase phase is the erasure of the erase block via a block erase. In one embodiment, the erase phase is further divided into read and write cycles. The move and erase phases may be further divided into sub-operations that go into the two steps that affect maintenance of the translation tables as well as handling wear leveling and power fail.

Thereafter, during operation of the managed NAND 204, the read/write cycle times and block erase cycle times of the NAND array 208, which correspond to the garbage collection atomic operations, are measured and stored for tracking (block 302). Using currently available NAND devices as an example, typical read cycle times are in the range of 25 to 50 microseconds, typical write cycle times are in the range of 200 to 700 microseconds, and block erase cycle times are in the range of 2,000 to 3,000 microseconds.

Depending on the type of memory involved, the type of read and write cycle times that may be measured and stored may include page read and page write cycle times, or block read and block write cycle times, or both. In one embodiment, the read cycle times, write cycle times, and block erase cycle times are stored by NAND controller 210.

The managed NAND 204 then receives a communication from the processor 202 indicating at least one idle period when an application executing on the processor will not make a request of the managed NAND 204, wherein the communication indicates a time duration of the idle period (block 304). According to the exemplary embodiment, the processor 202 transmits the communication to the managed NAND 204 in the form of a new command, referred to herein an opportunistic garbage collection (OGC) command, explained further below.

In response to receiving the communication, the managed NAND 204 performs at least one of the garbage collection atomic operations within the time duration, whereby garbage collection can be performed during the idle periods, rather than when the memory device is full (block 306).

In one embodiment, the NAND controller 210 compares the stored read cycle times, write cycle times, and block erase cycle times with the time duration of the idle period to determine which ones of the atomic operations can be performed within the given time duration. The managed NAND 204 now has knowledge of how long it takes to perform each task during OGC, and for how long the application(s) executing on the processor 202 will not make memory requests. From this knowledge, the managed NAND 204 can determine which OGC task to perform. For example, if an OGC command indicates that the idle time duration is 1 ms, the managed NAND 204 may determine that there is enough time to read or write a page during OGC, but not enough time to erase a block, which may take 3 ms, for example.

According to the exemplary embodiment, the communication from the processor 202 to the managed NAND 204 is based on the creation of a real-time schedule in the processor 202 that takes into account needs of an application processing real-time media as well as expected performance of the managed NAND 204.

Figure 4:
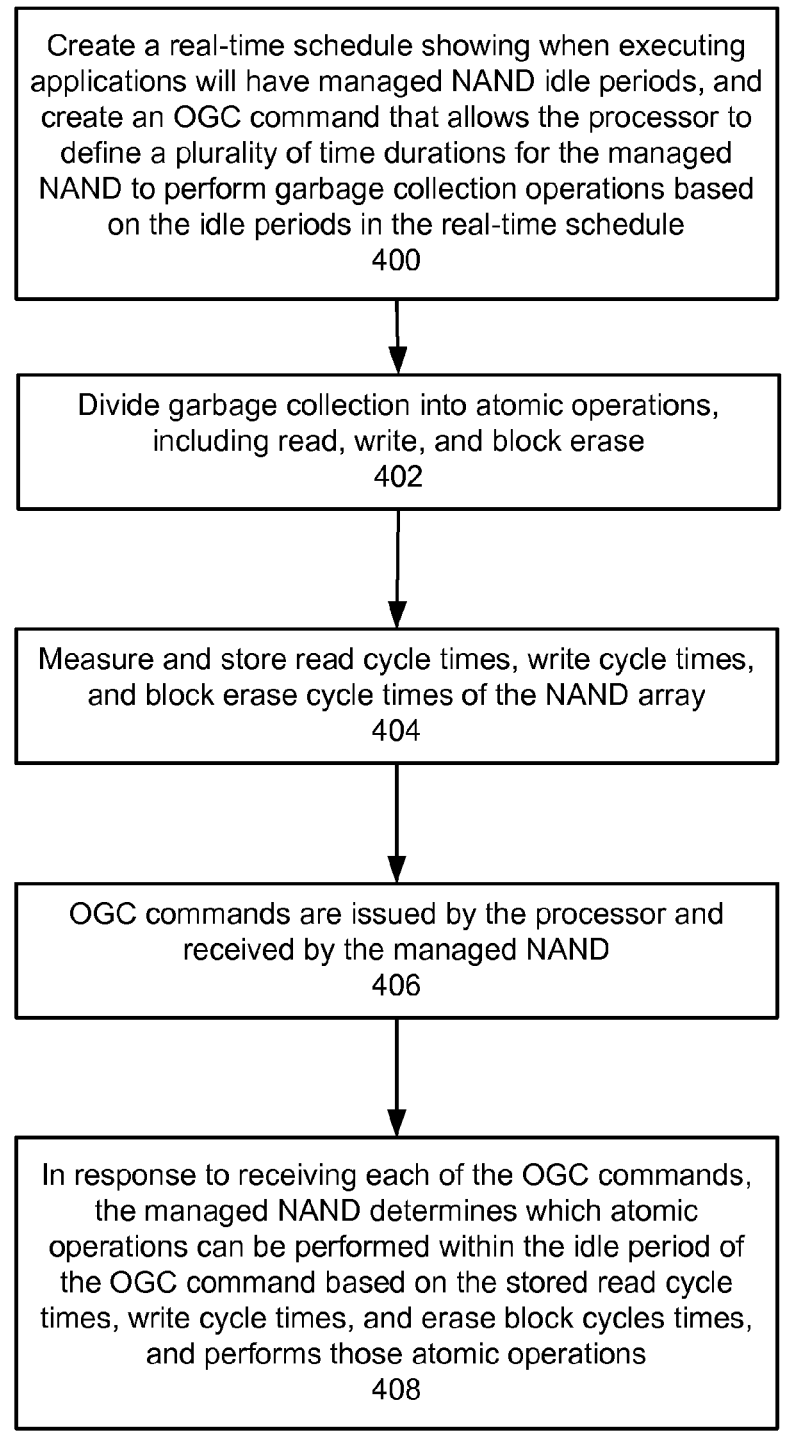
FIG. 4 is a flow diagram illustrating the demand-driven opportunistic garbage collection (OGC) process in further detail.

FIG. 4 is a flow diagram illustrating the demand-driven opportunistic garbage collection (OGC) process in further detail. The process begins by creating a real-time schedule showing when executing applications will have managed NAND 204 idle periods, and creating an OGC command for the managed NAND 204 that allows the processor 202 to define a plurality of time durations for the managed NAND 204 to perform garbage collection operations based on the idle periods in the real-time schedule (block 400).

Figure 5:
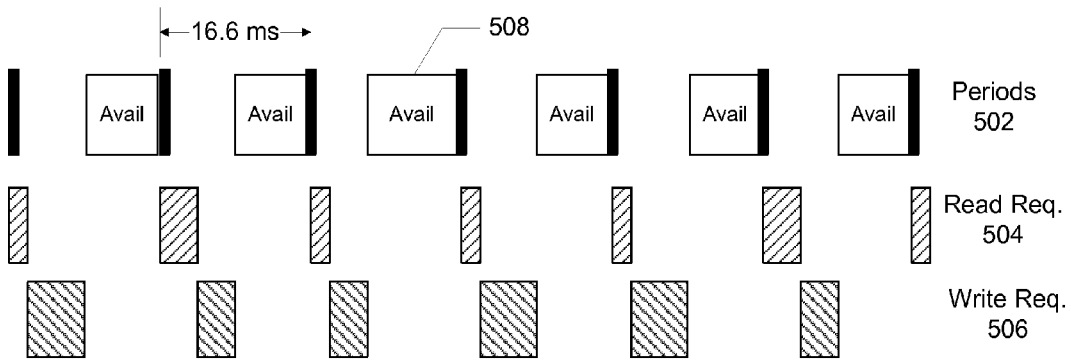
FIG. 5 is a diagram showing a portion of an exemplary schedule of activity for an application that supports real-time media requirements.

FIG. 5 is a diagram showing a portion of an exemplary schedule of activity for an application that supports real-time media requirements. In this example, a schedule of activity 500 is shown for an application that supports a 30 frames per second (fps) video stream. The schedule shows that at 30 fps, the video stream has 16.6 ms periods 502, during which, read and write requests 504 and 506 are made to the managed NAND 204. After the read and write requests 504 and 506, there is a time gap 508 left available in each period 502.

Figure 6:
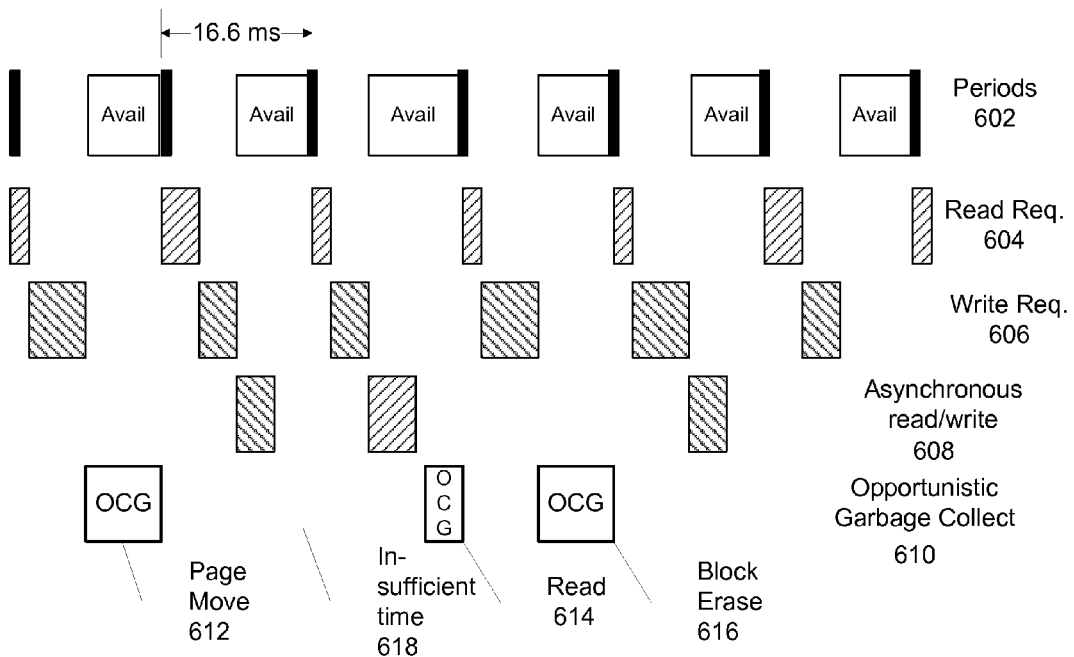
FIG. 6 is a diagram illustrating a portion of an exemplary real-time schedule for a memory that takes into account activity of an application that supports real-time media requirements.

FIG. 6 is a diagram illustrating a portion of an exemplary real-time schedule for a managed NAND 204 that takes into account activity of an application that supports real-time media requirements, such as a video stream. The real-time schedule 600 includes time periods 602 (e.g., 16.6 ms in length) during which an application may make read request 604 and write request 606 of the managed NAND 204 for processing the real-time media stream. The application's read and write requests 604 and 606 for the real-time media have priority and are processed first.

According to the exemplary embodiment, a time gap is left over in each period 602 during which at least one of two additional items may be scheduled. First, asynchronous read/write requests (608) of the managed NAND 204 from asynchronous thread activity (such as from an e-mail client) may be scheduled that take priority. Second, opportunistic garbage collection (OGC) commands (610) may be scheduled to the managed NAND 204.

In one embodiment the OGC command 610 is used to indicate idle periods or time slots when no read or write requests will be made of the managed NAND 204. Each OGC command 610 minimally indicates the time duration of the idle period. According to the exemplary embodiment, the real-time schedule 600 for the managed NAND 204 needs to be designed to take into account the needs of the real-time media stream as well as the expected performance of the memory. That is, in one embodiment, the minimum time duration of the OGC command 610 for the idle periods in the real-time schedule 600 may be greater than the minimum time necessary for the memory to perform a block erase. For example, since it takes up to 3 milliseconds to erase a block, the minimum time duration for the idle periods of the OGC commands 610 in the real-time schedule 600 must be greater than 3 milliseconds or the first time the memory needs to erase a block, the real-time schedule 600 may overflow.

FIG. 6 shows example atomic operations that could be performed in the available times during the issued OGC commands 610. Examples shown include a page move 612, a read 614, and a block erase 616. Also shown is an insufficient time 618 in the schedule 600 to issue an OGC command 610, i.e., less than 3 ms available.

In one embodiment, the real-time schedule 600 may be created by the driver 20. In another embodiment, the real-time schedule 600 may be created by an operating system. In yet another embodiment the real-time schedule 600 may be created by an application.

Referring again to FIG. 4, garbage collection in the managed NAND 204 is divided into two primary phases: move and block erase, and the move phase is further divided into read and write, providing read, write, and block erase atomic operations (block 402). Some conventional memory devices (e.g. MMC protocol) may support block erase, but the block erase is not tied to the logical to physical mapping function nor to the garbage collection.

In addition, during operation of the managed NAND 204, the read cycle times, write cycle times, and block erase cycle times of the NAND array 208, which correspond to the atomic operations, are measured and stored (block 404).

After the real-time schedule is created and populated with the OGC commands 610, the OGC commands 610 are issued by the processor 202 and received by the managed NAND 204 (block 406). Each OGC command 610 includes an argument for conveying the time duration of the idle period, i.e., the amount of time left in the current time slot in which garbage collection can be done.

Conventionally, garbage collection is performed when a volume reaches a certain percentage of fullness, such as a 90% volume full threshold, for example. According to a further aspect of the exemplary embodiment, an OGC threshold is provided that is less than the normal garbage collection threshold that is used to trigger issuance of the OGC commands 610. Preferably, this second threshold is programmable with a configuration command, but as one example, may be set at approximately 80% of volume full. Thus, in this embodiment, the processor 202 would not issue OGC commands 610 until the managed NAND 204 reaches 80% full.

In response to receiving the OGC command 610, the memory determines which atomic operations can be performed within the idle period of the OGC command 610 based on the stored read cycle times, write cycle times, and erase block cycles times, and performs the atomic operations (block 408).

According to the exemplary embodiments, if the managed NAND 204 has a block to garbage collect and there is sufficient idle time to fully implement only one or more atomic operations, these atomic operations are performed, but by iteratively performing a sufficient number of atomic operations, the block is completely collected.

For example, when receiving the OGC command 610, the managed NAND 204 may begin to look up erase blocks to garbage collect according to an internally executed algorithm, but will also take into account that there is only the specific time duration of one or more idle periods to spend on the activity. If the memory received an OGC command 610 indicating an idle period of 5 milliseconds, for instance, then the memory may locate pages to move, and move approximately 5 of the pages. The computation time, the page read access and the write cycle time (using parameters typical of current NANDs) would allow the memory to only move these 5 pages. This would be repeated until enough pages had been moved to make the entire erase block stale. Finally a 3 millisecond erase cycle would fit in the allotted OGC time of 5 milliseconds, and an erase block would be reclaimed.

By apportioning specific time slots to OGCs and by having a lower threshold applied to this opportunistic garbage collection, the exemplary embodiments make it no longer necessary for the managed NAND 204 to insert a large asynchronous garbage collection event into the real-time media stream, which may result in a significant reduction in required latency buffers.

A method and system for demand-driven opportunistic garbage collection for memory components has been disclosed. The present invention has been described in accordance with the embodiments shown, and one of ordinary skill in the art will readily recognize that there could be variations to the embodiments, and any variations would be within the spirit and scope of the present invention. For example, the present invention can be implemented using hardware, software, a computer readable medium containing program instructions, or a combination thereof. Software written according to the present invention is to be either stored in some form of computer-readable medium such as memory or CD-ROM, or is to be transmitted over a network, and is to be executed by a processor. Consequently, a computer-readable medium is intended to include a computer readable signal, which may be, for example, transmitted over a network. Accordingly, many modifications may be made by one of ordinary skill in the art without departing from the spirit and scope of the appended claims.

I claim:

1. A method comprising:
   receiving an opportunistic garbage collection (OGC) command from a processor providing notification of an impending occurrence of a memory idle period; the OGC command specifying a time duration of the idle period during which an application executing on the processor will not make a request of a memory;
   selecting one or more garbage collection atomic operations based, at least in part, on expected durations of the garbage collection atomic operations relative to the specified time duration of the idle period; and
   in response to the OGC command, performing the selected garbage collection atomic operations on the memory during the idle period.

2. The method of claim 1 wherein the OGC command comprises a real-time schedule that specifies when the application will have memory idle periods, and wherein the method comprises selecting and performing garbage collection operations based, at least in part, on the specified duration of the idle periods in the real-time schedule.

3. The method of claim 2 wherein the real-time schedule includes memory access time periods during which the application makes read/write requests of the memory for processing a real-time media stream.

4. The method of claim 3 wherein the real-time schedule further includes a time gap left over in each memory access time period during which at least one of two additional items are scheduled:
   asynchronous read/write requests of the memory from asynchronous thread activity; and
   the OGC command.

5. The method of claim 1 further comprising accessing stored read cycle times, write cycle times, and block erase cycle times of the memory to determine expected durations of garbage collection atomic operations.

6. The method of claim 1 further comprising providing an OGC threshold that is less than a first garbage collection threshold, wherein the OGC command is transmitted when the first OGC threshold is exceeded.

7. The method of claim 6 wherein the OGC threshold is at approximately 80% of memory volume full.

8. The method of claim 1 wherein selecting one or more garbage collection atomic operations further comprises comparing stored read cycle times, write cycle times, and block erase cycle times with the specified time duration of the at least one idle period to select which ones of the atomic operations can be performed within the time duration.

9. The method of claim 1 wherein the garbage collection atomic operations comprise a move phase comprising read and write cycles and a block erase phase.

10. An executable software product stored on a non-transitory computer-readable storage medium containing program instructions for performing garbage collection in a memory, the program instructions for:
receiving an opportunistic garbage collection (OGC) command from a processor providing notification of an impending occurrence of a memory idle period; the OGC command specifying a time duration of the idle period during which an application executing on the processor will not make a request of a memory;
selecting one or more garbage collection atomic operations based, at least in part, on expected durations of the garbage collection atomic operations relative to the specified time duration of the idle period; and
in response to the OGC command, performing the selected garbage collection atomic operations on the memory during the idle period.

11. The executable software product of claim 10 wherein the OGC command comprises a real-time schedule that specifies when the application will have memory idle periods, and wherein the method comprises selecting and performing garbage collection operations based, at least in part, on the specified duration of the idle periods in the real-time schedule.

12. The executable software product of claim 11 wherein the real-time schedule includes memory access time periods during which the application makes read/write requests of the memory for processing a real-time media stream.

13. The executable software product of claim 12 wherein the real-time schedule further includes a time gap left over in each memory access time period during which at least one of two additional items are scheduled:
asynchronous read/write requests of the memory from asynchronous thread activity; and
the OGC command.

14. The executable software product of claim 11 wherein the program instructions further comprise accessing stored read cycle times, write cycle times, and block erase cycle times of the memory to determine expected durations of garbage collection atomic operations for receiving the OGC command from the processor.

15. The executable software product of claim 10 further comprising program instructions for providing an OGC threshold that is less than a normal garbage collection threshold, wherein the OGC command is transmitted when the first OGC threshold is exceeded.

16. The executable software product of claim 15 wherein the OGC threshold is at approximately 80% of memory volume full.

17. The executable software product of claim 10 wherein performing at least one of the garbage collection atomic operations further comprises program instructions for comparing stored read cycle times, write cycle times, and block erase cycle times with the specified time duration of the at least one idle period to select which ones of the atomic operations can be performed within the time duration.

18. The executable software product of claim 10 wherein the garbage collection atomic operations comprise a move phase comprising read and write cycles and a block erase phase.

19. A memory system, comprising:
a bus;
a processor;
a memory coupled to the processor via the bus, the memory including a memory array and a memory controller for performing memory management functions for the memory array, including;
receiving an opportunistic garbage collection (OGC) command from the processor providing notification of an impending occurrence of a memory idle period; the OGC command specifying a time duration of the idle period during which an application executing on the processor will not make a request of a memory;
selecting one or more garbage collection atomic operations based, at least in part, on expected durations of the garbage collection atomic operations relative to the specified time duration of the idle period; and
in response to the OGC command, performing the selected garbage collection atomic operations on the memory during the idle period.

20. The memory system of claim 19 wherein the processor creates an OGC command that includes a real-time schedule that specifies when the executing application will have memory idle periods, and wherein the memory controller controls the memory to select and perform garbage collection operations based, at least in part, on the idle periods in the real-time schedule.

21. The memory system of claim 20 wherein the real-time schedule includes memory access time periods during which the executing application makes read/write requests of the memory for processing a real-time media stream.

22. The memory system of claim 21 wherein the real-time schedule further includes a time gap left over in each memory access time period during which at least one of two additional items are scheduled:
asynchronous read/write requests of the memory from asynchronous thread activity; and
the OGC command.

23. The memory system of claim 19 wherein the memory controller accesses stored read cycle times, write cycle times, and block erase cycle time of the memory to determine expected durations of garbage collection atomic operations.

24. The memory system of claim 19 wherein the processor provides an OGC threshold that is less than a first garbage collection threshold, wherein the OGC threshold is used to trigger issuance of the OGC command.

25. The memory system of claim 24 wherein the OGC threshold is at approximately 80% of memory volume full.

26. The memory system of claim 19 wherein the memory controller compares stored read cycle times, write cycle times, and block erase cycle times with the specified time duration of the at least one idle period to select which ones of the atomic operations can be performed within the time duration.

27. The memory system of claim 19 wherein the garbage collection atomic operations comprise a move phase comprising read and write cycles and a the block erase.

28. The memory system of claim 19 wherein the memory comprises a managed NAND having a NAND array and a NAND controller.

* * * * *